US010621984B2

(12) United States Patent
First et al.

(10) Patent No.: US 10,621,984 B2
(45) Date of Patent: Apr. 14, 2020

(54) USER-CONFIGURED AND CUSTOMIZED INTERACTIVE DIALOG APPLICATION

(71) Applicant: Google LLC, Mountain View, CA (US)

(72) Inventors: Uri First, Sunnyvale, CA (US); Yang Sun, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 106 days.

(21) Appl. No.: 15/960,444

(22) Filed: Apr. 23, 2018

(65) Prior Publication Data

US 2019/0102379 A1  Apr. 4, 2019

Related U.S. Application Data

(60) Provisional application No. 62/568,255, filed on Oct. 4, 2017.

(51) Int. Cl.
*G10L 15/22* (2006.01)
*G06F 8/38* (2018.01)
(Continued)

(52) U.S. Cl.
CPC ............... *G10L 15/22* (2013.01); *G06F 8/38* (2013.01); *G06F 9/44505* (2013.01);
(Continued)

(58) Field of Classification Search
CPC .............................. G10L 15/28; G10L 15/22
See application file for complete search history.

(56) References Cited

U.S. PATENT DOCUMENTS 6,173,266 B1 * 1/2001 Marx ...................... G10L 15/22
704/270
6,314,402 B1 * 11/2001 Monaco ................ H04M 3/493
704/270
(Continued)

FOREIGN PATENT DOCUMENTS

WO 2007047105 4/2007
WO 2016114922 * 7/2016

OTHER PUBLICATIONS

European Patent Office; International Search Report and Written Opinion of PCT Ser. No. PCT/US2018/054126; 16 pages; dated Jan. 29, 2019.

*Primary Examiner* — Shaun Roberts
(74) *Attorney, Agent, or Firm* — Middleton Reutlinger

(57) ABSTRACT

Implementations relate to generating and/or executing a customized interactive dialog application. The customized interactive dialog application may be generated from a state mapping tool that allows a user to generate custom states and custom transitions between the custom states. A customized configuration description is then generated based on the generated custom states and custom transitions. Further, a default configuration description is identified that includes additional or alternative states and transitions. In executing the customized interactive dialog application, dialog turns are generated based on the states and transition information, with the customized configuration description taking precedence and the default configuration description being utilized for any undefined states and/or transitions. Implementations additionally or alternatively relate to generating and/or executing a custom agent based on generated custom states and custom transitions, and a default configuration description.

19 Claims, 7 Drawing Sheets

(51) Int. Cl.
  *G06F 9/451* (2018.01)
  *G10L 17/22* (2013.01)
  *G06F 9/445* (2018.01)
  *G06F 40/30* (2020.01)
  *G06F 40/35* (2020.01)
  *G10L 15/28* (2013.01)
  *G06F 40/169* (2020.01)
  *G06F 40/205* (2020.01)

(52) U.S. Cl.
  CPC .............. *G06F 9/451* (2018.02); *G06F 40/30* (2020.01); *G06F 40/35* (2020.01); *G10L 15/28* (2013.01); *G10L 17/22* (2013.01); *G06F 40/169* (2020.01); *G06F 40/205* (2020.01)

(56) References Cited

U.S. PATENT DOCUMENTS

| | | | | |
|---|---|---|---|---|
| 6,321,198 | B1 * | 11/2001 | Hank | H04M 3/4936 704/270 |
| 6,505,162 | B1 * | 1/2003 | Wang | G10L 15/22 704/270 |
| 6,684,183 | B1 * | 1/2004 | Korall | G06F 17/271 704/257 |
| 7,653,545 | B1 * | 1/2010 | Starkie | G10L 15/22 704/257 |
| 8,046,227 | B2 * | 10/2011 | Starkie | G06F 8/30 704/270.1 |
| 8,346,560 | B2 * | 1/2013 | Ozkaragoz | G06F 17/289 704/270 |
| 9,240,197 | B2 * | 1/2016 | Begeja | G10L 15/063 |
| 9,275,641 | B1 * | 3/2016 | Gelfenbeyn | G10L 15/22 |
| 10,474,439 | B2 * | 11/2019 | Khan | G10L 15/22 |
| 2003/0007609 | A1 * | 1/2003 | Yuen | H04M 3/4938 379/88.16 |
| 2005/0091057 | A1 * | 4/2005 | Phillips | G10L 15/22 704/270.1 |
| 2005/0228668 | A1 * | 10/2005 | Wilson | G10L 15/193 704/256 |
| 2006/0025997 | A1 * | 2/2006 | Law | G10L 15/28 704/257 |
| 2009/0138262 | A1 * | 5/2009 | Agarwal | H04M 3/4938 704/235 |
| 2017/0193385 | A1 * | 7/2017 | Beaufort | G06F 17/279 |

* cited by examiner

305 FactsServer:{

WELCOME{
　　　　response: "Hi, welcome to Johnny Fact
　　　　Serving sample app. Here comes your
　　　　first fact. <audio "sound.ogg">

310
　　　　toState {SERVE_FACT}
　　}

SERVE_FACT:{
　　　　response:
　　　　　　"FACT 1"
　　　　　　"FACT 2"
　　　　　　"FACT 3"
　　　　　　"FACT 4"

toState {ASK_FOR_ANOTHER}
315　　}

ASK_FOR_ANOTHER:{
　　　　type: STATE_TYPE.USER_INPUT
　　　　response: "Would you like to hear
　　　　another fact?"

toState: {
　　　　　　YES: 'SERVE_FACT'
320　　　　　　NO: 'GOODBYE'
　　　　}
　　}

GOODBYE:{
　　　　type: STATE_TYPE.FINAL
　　　　response: "OK. Goodbye."
　　}
}

FIG. 3

USER-CONFIGURED AND CUSTOMIZED INTERACTIVE DIALOG APPLICATION

BACKGROUND

An automated assistant (also known as "personal assistant", "mobile assistant", etc.) may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output). An automated assistant interacted with via a client device may be implemented via the client device itself and/or via one or more remote computing devices that are in network communication with the client device (e.g., computing device(s) in "the cloud").

SUMMARY

This specification is directed generally to methods, apparatus, and computer readable media for creating and executing customized interactive dialog applications based on customized configuration descriptions that are generated based on user interface input. In some implementations, a user utilizes a mapping tool to generate a set of custom states for the customized interactive dialog application, and to generate custom transitions, between the custom states, for the customized interactive dialog application. A customized configuration description can be generated based on the custom states and custom transitions between states, as specified by the user via interaction with the mapping tool. A corresponding default configuration description is selected (e.g., from a plurality of candidate default configuration descriptions). For example, the default configuration description can be selected based on a class of interactive dialog application being generated and/or based on a particular automated assistant (of a plurality of candidate automated assistants) for which the customized interactive dialog application is being generated. The selected default configuration description can include default states and default transitions, some (or all) of which are not be included in the customized configuration description. The customized configuration description and the default configuration description may then be utilized together to execute the customized interactive dialog application in engaging in a human-computer dialog. During dialog turns of the resulting dialog, the customized configuration description can be utilized for some dialog turns based on states that are explicitly described in the customized configuration description and the default configuration description may be utilized for some other dialog turns based on states that are not explicitly described in the customized configuration description.

As one example of some implementations described herein, a developing user may have interest in configuring a customized application that enables an invoking user to interact with the customized application via an automated assistant (e.g., via an assistant interface of a client device of the invoking user), where the customized application is configured to engage in an interactive dialog with the user and provide facts to the user as part of the interactive dialog. The developing user can utilize a graphical user interface-based mapping application to generate a custom "Serve Fact" state, with the state including one or more statements of fact that may be provided by the automated assistant for rendering to an invoking user upon occurrence of the state during an interactive dialog with an invoking user. Further, the developing user may define a "Prompt For Next Fact" state that is automatically transitioned to after the automated assistant causes the fact to be rendered the invoking user. The "Prompt For Next Fact" state may include a question for the automated assistant to cause to be rendered (audibly and/or graphically) as output to the invoking user. For example, the question can prompt the invoking user as to whether the invoking user has interest in being provided another fact. Further, the "Prompt For Next Fact" state can include transition information to cause the automated assistant to transition back to the "Serve Fact" state if affirmative user interface input from the invoking user is received in response to the rendering of the question. The developing user can optionally also define a "Welcome" state that can cause a welcome message to be rendered upon initial invocation of the customized application by an invoking user and/or a "Goodbye" state that causes the interactive dialog with the customized application to be terminated (optionally after rendering of a goodbye message). The developing user can also define one or more invocation phrases to associate with the customized application. Once the developing user has completed defining the custom states and custom transitions, the customized configuration description is generated based on the custom states and custom transitions. Further, a default configuration description for the fact serving application is identified, which may be specific to a selected class of interactive dialog application or may be a single default configuration description for all applications. When an invoking user subsequently causes the customized application to be invoked, the customized configuration description is utilized in engaging in the interactive dialog with the invoking user when states of the dialog are defined by the customized states of the customized configuration description, while the default configuration description is utilized when dialog states are encountered that are not defined in the customized configuration description. For example, the customized configuration description may not include a definition for a "GOODBYE" state, so the "GOODBYE" state defined in the default configuration description may be utilized instead to generate a final dialog turn for an instance of the dialog application. Further, the default configuration description may include default definitions for one or more parameters that may apply to all states (which may or may not be defined in a customized configuration description). For example, the default configuration description may include a defined "No Input" parameter that may be, by default and if not defined in the customized configuration description, a parameter of all states. Thus, the default "No Input" parameter may be included with all states and may be utilized to generate dialog if a user input was not understood and/or if a user waits a period of time without providing expected input when the dialog application is in any state. In some implementations, the invoking user causes the customized application to be invoked by providing natural language input (e.g., a spoken utterance), to the automated assistant, that includes an invocation phrase associated with the customized application via user interface input of the developing user. For example, the developing user can provide an invocation phrase of "Bob's trivia game" to associate with a customized application, and the automated assistant can identify the customized application in response to an invoking user's utterance of "Play Bob's trivia game", based on the customized application being stored in association with the invocation phase.

Alternatively or additionally, an agent may be generated based on a user-created configuration description and/or from a mapping tool, and the agent may be later executed. For example, the system may receive state and transition information, generate a customized configuration description, identify a default configuration description, and generate an agent based on the descriptions. The agent may then be utilized in various automated assistant interactions. For example, an automated assistant can receive user input, generate an agent command based on the user input, transmit the agent command to the agent, the agent can generate responsive content based on the agent command, and the responsive content (or a conversion thereof) provided in response to the user input.

Implementations described herein can enable generating a customized interactive dialog application and/or a customized interactive agent in situations in which a developing user only defines, via user interface input, some of the states that are necessary for a functional and/or robust application and/or agent. For example, those implementations can leverage default configuration descriptions to obviate the need for additional user interface input explicitly defining various states and/or state transitions necessary for a functional and/or robust application and/or agent. In these and other manners, a quantity of user interface inputs necessary for creation of an application and/or agent can be reduced, which can conserve various resource(s) of client device(s) utilized by the developing user in generating the customized interactive dialog application. Further, network resources can be reduced as data corresponding to various states and/or state transitions need not be transmitted by the client device(s) to remote computer system(s) that generate the customized interactive dialog application. Yet further, the reduced quantity of user interface inputs can be of benefit to developing users that have reduced dexterity.

Additionally, as described herein, the same default configuration description(s) can be utilized in various implementations for each of a plurality of disparate customized interactive dialog applications. This can enable the same default configuration descriptions to be utilized without a separate instance having to be fully separately stored for each of the disparate customized applications. In this manner, storage resources can be conserved as the plurality of disparate customized applications can share configuration descriptions, instead of separate instances needing to be separately stored for each of the disparate customized applications. Yet further, various implementations described herein leverage default configuration descriptions to supplement custom states and custom transitions defined in generating a customized interactive dialog application and/or agent. In those implementations, leveraging of the default configuration descriptions make the generated application and/or agent functional and/or more robust. Making the generated application and/or agent functional and/or more robust can lead to improved human-computer interactions, such as interactions that occur during an interactive dialog engaged in via human interaction (e.g., via an assistant interface of a client device) with an automated assistant that is executing the application and/or that that is interfacing with the agent. For example, utilization of the default configuration description can enable the automated assistant to be responsive to various error conditions, unexpected user interface inputs, and/or other situations where failures would have otherwise occurred, thereby providing improved human-computer interactions.

The above description is provided as an overview of only some implementations described herein. Additional and alternative implementations are described in more detail below.

In some implementations, a method performed by one or more processors is provided and includes receiving an indication of an interactive dialog application and a state map of custom states and custom state transitions from a graphical state application for a user-created customized interactive dialog application. Each of the custom states defines custom state information for a corresponding one of the custom states and each of the custom state transitions defines custom transition information from a corresponding one of the custom states. The method further includes generating a customized configuration description based on the custom states and custom state transitions. The method further includes identifying a default configuration description based on the indication of the interactive dialog application. The default configuration description includes default state information and default transition information for one or more default states. The method further includes receiving natural language input provided via an assistant interface of an additional client device operated by an additional user, and determining the natural language input references the interactive dialog application. The method further includes, in response to determining the natural language input references the interactive dialog application, executing a customized interactive dialog application based on both the customized configuration description and the default configuration description. In some implementations, executing the customized interactive dialog application includes: generating multiple instances of output for rendering via the assistant interface during an interactive dialog between the additional user and the customized interactive dialog application. Each of the multiple instances of output is for a corresponding one of multiple dialog turns of the interactive dialog during execution of the customized interactive dialog application, and at least some of the multiple instances of output are generated using the customized configuration description and at least some of the multiple instances of output are generated using the default configuration description. In some implementations, one or more instances of output may be generated based on both the customized configuration description and the default configuration description.

As one example: an instance of output in an interactive dialog can be generated using a state defined in the customized configuration description; an additional instance of output in the interactive dialog can be generated using an additional state defined in the default configuration description; and a further instance of output in the interactive dialog can be generated using a further state that is based on content from both the default configuration description and the customized configuration description.

These and other implementations of technology disclosed herein may optionally include one or more of the following features.

In some implementations, generating a given instance of output of the multiple instances of output at a given dialog turn of the multiple dialog turns includes: identifying a current state of the interactive dialog at the given dialog turn; determining whether the current state of the interactive dialog is one of the custom states of the customized configuration description; and in response to determining the current state of the dialog is one of the custom states of the customized configuration description: generating the given instance of output based on the custom state information defined for the one of the custom states. In some versions of those implementations, generating an additional given instance of output of the multiple instances of output at a given additional dialog turn of the multiple dialog turns includes: identifying an additional current state of the interactive dialog at the additional dialog turn; determining whether the additional current state of the interactive dialog is one of the custom states of the customized configuration description; and in response to determining the additional current state of the dialog is not one of the custom states of the customized configuration description: identifying one of the default states that matches the additional current state; and generating the additional given instance of output based on the default state information defined for the one of the default states. In some of those versions, the method further includes, in response to identifying the one of the default states that matches the additional current state: using the default transition information for the one of the default states to transition to a further custom state of the custom states of the customized configuration description; after generating the additional given instance of output based on the default state information defined for the one of the default states: receiving, in response to the additional given instance of output, responsive user interface input provided via the assistant interface of an additional client device; and based on having transitioned to the further custom state, using the further custom state to generate a further instance of output of the multiple instances of output at a given further dialog turn of the multiple dialog turns.

In some implementations, generating a given instance of output of the multiple instances of output at a given dialog turn of the multiple dialog turns includes: identifying a current state of the interactive dialog at the given dialog turn; determining whether the current state of the interactive dialog is one of the custom states of the customized configuration description; and in response to determining the current state of the dialog is one of the custom states of the customized configuration description: generating the given instance of output based on the custom state information defined for the one of the custom states. As one example, the custom state information defined for the one of the custom states can include custom audio, and generating the given instance of output can include causing the custom audio to be rendered via one or more speakers of the additional client device. As another example, the custom state information defined for the one of the custom states can additionally or alternatively include an external resource for use in generating the given instance of output, and generating the given instance of output can include interfacing with the external resource. For instance, interfacing with the external resource can include communicating with the external resource In some implementations, the custom transition information for a given custom state of the custom states includes an expected response and an additional custom state of the custom states to transition to if the expected response is received. In some versions of those implementations, the custom transition information for the given custom state further includes an alternative expected response and an alternative custom state of the custom states to transition to if the alternative expected response is received. In some additional or alternative versions of those implementations, the custom transition information for a given custom state of the custom states lacks any definition for at least one possible response, and generating a given instance of output of the multiple instances of output at a given dialog turn of the multiple dialog turns includes: receiving, while in the given custom state, user interface input provided via the assistant interface of the additional client device; determining that the user interface input does not conform to the custom transition information for the given custom state; and in response to determining that the user interface input does not conform to the custom transition information for the given custom state: identifying one of the default states that conforms to the user interface input; and generating the given instance of output based on the one of the default states.

In some implementations, a method implemented by one or more processors is provided and includes receiving an indication of an interactive dialog application and a state map of custom states and custom state transitions from a graphical state application for a user-created customized interactive dialog application. Each of the custom states defines custom state information for a corresponding one of the custom states and each of the custom state transitions defines custom transition information from a corresponding one of the custom states. The method further includes generating a customized configuration description based on the custom states and the custom state transitions. The method further includes identifying a default configuration description based on the indication of the interactive dialog application. The default configuration description includes default states, and default state information and at least one default state transition for each of the default states. The method further includes generating a merged configuration description based on the customized configuration description and the default configuration description. Generating the merged configuration description can include: identifying a given custom state, of the custom states, that is included in the customized configuration description and that includes a counterpart given default state, of the default states in the default configuration description; and based on the given custom state being included in the customized configuration description: including the given custom state in the merged configuration description without including the counterpart given default state in the merged configuration description. The method can further include generating a customized agent based on the merged configuration description. The customized agent is executable by a system of one or more computers to interface with an automated assistant in engaging in interactive human-computer dialog.

These and other implementations of technology disclosed herein may optionally include one or more of the following features.

In some implementations, generating the merged configuration description includes: identifying a given custom state transition, of the custom state transitions, that is included in the customized configuration description and that includes a counterpart given default state transition, of the default state transitions, in the default configuration description; and based on the given custom state transition being included in the customized configuration description: including the given custom state transition in the merged configuration description without including the counterpart given default state transition in the merged configuration description.

In some implementations, in interfacing with the automated assistant in engaging in the interactive human-computer dialog, the customized agent receives requests from the automated assistant that are generated based on user interface input provided to the automated assistant via a client device, and the customized agent generates responsive content and transmits the responsive content to the automated assistant for provisioning of output that is based on the responsive content.

In some implementations, the default configuration is specific to the automated assistant, and the customized agent is particularized to the automated assistant. In some versions of those implementations, the method further includes identifying an additional default configuration that is specific to an additional automated assistant. The additional default configuration description includes additional default states, and additional default state information and at least one additional default state transition for each of the additional default states. In those versions, the method further includes: generating an additional merged configuration description based on the customized configuration description and the additional default configuration description and generating an additional customized agent based on the merged configuration description. The additional customized agent is executable by an additional system of one or more computers to interface with the additional automated assistant in engaging in interactive human-computer dialog. Generating the additional merged configuration description can include: identifying a given additional custom state, of the custom states, that is included in the customized configuration description and that includes a counterpart additional given default state, of the additional default states in the additional default configuration description; based on the given additional custom state being included in the customized configuration description: including the given additional custom state in the additional merged configuration description without including the counterpart given additional default state in the additional merged configuration description.

In some implementations, generating the merged configuration description further includes: determining that an additional default state, of the default states in the default configuration description, does not include any counterpart in the custom states included in the customized configuration description; and based on determining that the additional default state does not include any counterpart in the custom states: including the additional default state in the merged configuration description. In some of those implementations, the method further includes determining that the additional default state is indicated as mandatory in the default configuration description, and including the additional default state in the merged configuration description is further based on determining that the additional default state is indicated as mandatory.

In addition, some implementations include one or more processors of one or more computing devices, where the one or more processors are operable to execute instructions stored in associated memory, and where the instructions are configured to cause performance of any of the aforementioned methods. Some implementations additionally or alternatively include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example customized configuration description for the state diagram illustrated in FIG. 2.

DETAILED DESCRIPTION

Figure 1:
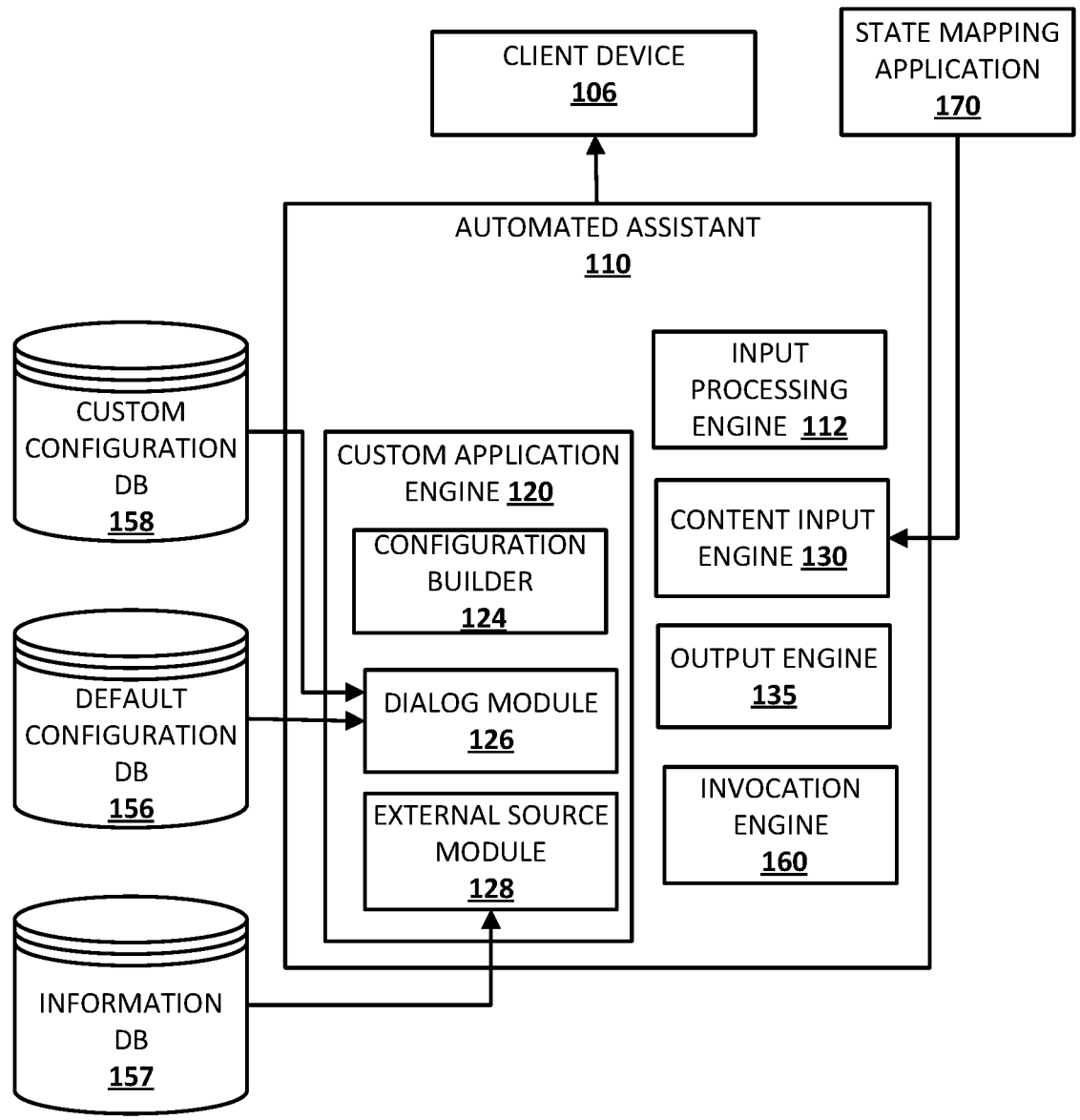
FIG. 1 is a block diagram of an example environment in which implementations disclosed herein may be implemented.

In some instances, a user may have interest in generating a customized interactive dialog application and the user may provide content in the form of a state mapping and an indication of the customized interactive dialog application to an automated assistant. The content may be, for example, input from a visual development tool that allows a user to define one or more custom states and indicate transition conditions to transition between the defined states utilizing a mapping tool. In some implementations, the states may include prompts, statements, sounds, and/or custom audio that may be provided to a subsequent user by the automated assistant upon execution of the customized interactive dialog application (also referred to herein simply as "customized application"). Further, based on the indication of the customized interactive dialog application, a default configuration description may be identified that includes one or more default states that may be encountered by a subsequent user while executing the customized application. For example, when creating the state mapping, the user may not define one or more states and/or transitions to handle instances when a subsequent user of the customized application provides an unexpected response. However, the default configuration description may include one or more states and/or default parameters for all generated states to handle those instances. By requiring the user to define only those states that are custom and optionally allowing the user to customize default behavior of states, the resulting custom interactive dialog application is more robust and less prone to errors. Moreover, as described herein, default configuration descriptions can be utilized for each of a plurality of disparate customized applications, thereby enabling the same configuration descriptions to be utilized without a separate instance having to be fully separately stored for each of the disparate customized applications. In this manner, storage resources can be conserved as the plurality of disparate customized applications can share configuration descriptions, instead of separate instances needing to be separately stored for each of the disparate customized applications. Various types of customized applications across various verticals can be created utilizing implementations disclosed herein such as, for example, gaming, interactive voice response, and/or customer support verticals.

In some implementations, a single configuration description may be generated based on a default configuration description and one or more customized configuration descriptions. Thus, although described herein as separate descriptions, a merged dialog application description may be generated that includes customized states, default states, customized transitions, default transitions, customized parameters of states, default parameters of states, and/or other attributes of states for a customized dialog application. For example, a state may be defined in both a customized and default configuration description with one or more parameters of the state only defined in the default description. A merged configuration description may include the defined state from the customized configuration description that additionally includes the parameters only defined in the default description.

Now turning to FIG. 1, an example environment in which techniques disclosed herein may be implemented is illustrated. The example environment includes a client device 106, an automated assistant 110, a custom application engine 120, and a state mapping application 170. The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet). Further, although state mapping application 170 is shown as separate from the client device 106 and the automated assistant 110, in some implementations, state mapping application 170 may be an application executing on the client device 106 and/or the automated assistant 110. Similarly, while custom application engine 120 and its constituent components are depicted as part of automated assistant 120, this is not required, and one or more of these components may be implemented separately and/or may be a subcomponent of custom application engine 120.

Although only one client device 106 is illustrated in combination with the automated assistant 110, in many implementations the automated assistant 110 may be remote and may interface with each of a plurality of client devices of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 includes an input processing engine 112, a content input engine 130, an output engine 135, and an invocation engine 160. In some implementations, one or more of the engines of automated assistant 110 may be omitted, combined, and/or implemented in a component that is separate from automated assistant 110. Moreover, automated assistant 110 may include additional engines not illustrated herein for the sake of simplicity.

The automated assistant 110 receives instances of user input from the client device 106. For example, the automated assistant 110 may receive free-form natural language voice input in the form of a streaming audio recording. "Free-form natural language input" as used herein refers to user input that is not constrained to an enumerated list of options. The streaming audio recording may be generated by the client device 106 in response to signals received from microphone(s) of the client device 106 that capture(s) spoken input of a user of the client device 106. As another example, the automated assistant 110 may receive free-form natural language typed input. In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input.

In some implementations, automated assistant 110 may receive an indication of a particular application with input from the user. For example, automated assistant 110 may receive an indication of an interactive dialog application and state information, indicating that the state information is to be utilized to generate a customized version of the interactive dialog application. The indication of the interactive dialog application can include a description of which of a plurality of classes of applications the state and transition information is to be utilized in generating. In some implementations, the input processing engine 112 may identify that provided audio includes an indication of a dynamic interactive dialog application and provide subsequent audio to the invocation engine 160 for further processing. For example, input processing engine 112 may receive input of "Assistant, run the Facts Server" and input processing engine 112 may identify that a "Facts Server" application is being invoked. Thus, input processing engine 112 may parse the received audio and provide the parsed content to invocation engine 160 to determine which application is being invoked. In some implementations, the invocation engine 160 may invoke an application by identifying a corresponding customized configuration description and executing an application utilizing the customized configuration description and a default configuration description. In some implementations, the invocation engine 160 may identify an agent that has been generated previously based on a customized configuration description and default configuration description.

The automated assistant 110 provides an instance of output in response to receiving an instance of user input from the client device 106. The instance of output may be, for example, audio to be audibly presented by the device 106 (e.g., output via a speaker of the client device 106), text and/or graphical content to be graphically presented by the device 106 (e.g., rendered via a display of the client device 106), etc. As described herein, some instances of the output may be based on one or more custom states defined by the user, either via state mapping application 170 or via a custom configuration description.

The input processing engine 112 of automated assistant 110 processes natural language input and of the user received via client devices 106 and generates annotated output for use by one or more other components of the automated assistant 110, such as custom application engine 120. For example, the input processing engine 112 may process natural language free-form input that is generated by a user via one or more user interface input devices of client device 106. The generated annotated output may include one or more annotations of the natural language input and optionally one or more (e.g., all) of the terms of the natural language input. As another example, the input processing engine 112 may additionally or alternatively include a voice to text module (also referred to as a "speech to text" or "STT" module) that receives an instance of voice input (e.g., in the form of digital audio data), and converts the voice input into text that includes one or more text words or phrases. In some implementations, the voice to text module is a streaming voice to text engine. The voice to text module may rely on one or more stored voice to text models (also referred to as language models) that each may model a relationship between an audio signal and phonetic units in a language, along with word sequences in the language.

In some implementations, the input processing engine 112 is configured to identify and annotate various types of grammatical information in natural language input. For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

Content input engine 130 processes custom state information defined by the user, including state information and transition information defined by the user operating a state mapping application 170, to be utilized to generate a custom interactive dialog application. For example, referring to FIG. 2, an example of a state mapping is provided that may be generated by a user using state mapping application 170. The state mapping 200 includes a "Welcome" state 205 that defines a welcome message 206 and a sound 207 that may be provided for rendering (e.g., audibly and/or graphically) to a subsequent user that has invoked the application. A "Serve Fact" state 210 includes a series of facts 211 that may be provided for rendering to the invoking user. The transition between the "Welcome" state 205 and the "Serve Fact" state 210 is not conditional; instead, the "Welcome" state is a "pass through" state whereby the "Serve Fact" state 210 always follows the "Welcome" state 205 regardless of input from the user. Similarly, the "Ask For Another" state 215 always follows the "Serve Fact" state 205. However, the "Ask For Another" state 215 is a "yes/no" type state. As described herein, on dialog turns in this state, the user is prompted for input through a prompt rendered at a corresponding client device, and the application expects either "yes" or "no" as input. Based on the input from the user, the application transitions to the "Serve Fact" state 205 if the answer is "yes", or to the "Goodbye" state 220 if the answer is "no". In some implementations, dialog module 126 and/or input processing engine 112 may identify other input as conforming to "yes" or "no" and transition accordingly. For example, a user may provide "sure" as a response and dialog module 126 may determine that "sure" is synonymous with "yes" and, as a result, can transition from the "Ask For Another" state 215 to the "Serve Fact" state 205 since the answer is synonymous with "yes". In some implementations, content input engine 130 may instead be a component of the custom application engine 120. For example, content input engine 130 may only handle content that is provided for generating customized dialog applications and not other content that may be provided to the automated assistant 110.

The output engine 135 provides instances of output to the client device 106. In some implementations, an instance of output may be based on a customized interactive dialog application generated by a user operating custom application engine 120. In some implementations, the output engine 135 may include a text to speech ("TTS") engine that converts textual components of responsive content to an audio format, and the output provided by the output engine 135 is in an audio format (e.g., as streaming audio). In some implementations, the responsive content may already be in an audio format. In some implementations, the output engine 135 additionally or alternatively provides textual reply content as output (optionally for conversion by the device 106 to audio) and/or provides other graphical content as output for graphical display by the client device 106.

The custom application engine 120 includes a configuration builder module 124, a dialog module 126, and an external source module 128. In some implementations, module(s) of custom application engine 120 may be omitted, combined, and/or implemented in a component that is separate from the custom application engine 120. Moreover, custom application engine 120 may include additional modules not illustrated herein for the sake of simplicity.

The dialog module 126 can utilize one or more grammar models, rules, and/or annotations from input processing engine 112 in interacting with a user via the client device 106. The dialog module 126 may generate prompt(s) to solicit further user input related to an executing interactive dialog application. Any prompt(s) generated by the dialog module 126 may be provided for presentation to the user by the output engine 135 (e.g., through rendering at the client device 106) and further responsive user input received. The dialog module 126 may utilize one or more custom configuration descriptions in providing content to a user that is creating a customized interactive dialog application (hereinafter also referred to as the "developing user"), as described in greater detail herein.

Configuration builder 124 receives the input from the developing user (either from state mapping application 170 or from one or more other components) and generates a customized configuration description based on the state map and transitions. A customized configuration description is a document that includes states that have been explicitly defined by the developing user and conditions whereby an interactive dialog application transitions from one state to another. For example, referring to FIG. 3, an example customized configuration description is provided. The description includes a "Welcome" state 305, which includes a welcome phrase to be provided to a user that invokes the application (hereinafter the "invoking user"). Further, the "Welcome" state 305 includes a condition for transitioning out of the state. In this case, all transitions are to the "Serve Fact" state 310 and require no input from the invoking user. Next, a "Serve Fact" state 310 is defined that includes the facts that were provided by the developing user via the state mapping application 170. Further, the "Serve Fact" state 310 description includes a transition to an "Ask Another" state 315 without input from the user. The "Ask Another" state 315 includes a prompt to provide to the invoking user as well as a condition on which state to transition to based on input from the invoking user. The "Ask Another" state 315 description indicates to transition to the "Serve Fact" state 310 if the invoking user responds "yes" and to the "Goodbye" state 320 if the invoking user responds "no." The "Goodbye" state 320 has no transitions since it is a final state (as indicated by "type: STATE_TYPE.FINAL") and indicates that the application is finished executing.

In addition to the states described in FIG. 3, any number of additional states and/or types of states may be included in a customized configuration description. For example, one or more states may receive a number as input, either via a voice command of a user or via other user input. Also, for example, a state may receive "any" input from a user without specifying exact expected input. As an example, the customized dialog application may provide a user with an open-ended question that does not require input of a certain type, and the custom state may indicate that "any" input received from the user is acceptable to transition to a new state.

In some implementations, customized configuration descriptions generated by the configuration builder 124 may be utilized to generate customized applications and/or agents for each of one or more disparate automated assistant platforms (e.g., disparate automated assistant platforms that are each controlled by a separate party). For example, a single set of customized configuration descriptions can be generated by the configuration builder 124, and utilized to generate a corresponding customized application and/or agent for each of multiple disparate automated assistants. For instance, a first default configuration that is specific to a first automated assistant platform can be utilized to generate a corresponding customized application and/or agent for the first automated assistant platform. Further, a second default configuration that is specific to a second automated assistant platform (but that may have one or more overlapping states and/or state transitions with the first default configuration) can be utilized to generate a corresponding customized application and/or agent for the second automated assistant platform. In these and other manners, user interface input provided by a developing user and utilized to generate customized configuration descriptions can be utilized to generate multiple agents and/or applications for multiple platforms, without requiring the user to provide multiple disparate instances of user interface input for each of the multiple platforms.

In some implementations, one or more of the state names and/or transition names may be pre-defined. For example, in some implementations, all starting states may be named "Welcome" and/or all ending states may be named "Goodbye." Further, in some implementations, one or more categories of states and/or transitions may be pre-defined. For example, "Ask Another" state 315 includes a definition of the state as a "User Input" state, which, when the application is executing via the custom application engine 120, may indicate to the dialog module 126 to wait for input from the invoking user to determine which state to transition to for the next dialog turn. Other types of states may be defined, such as a "Multiple Choice" state type, wherein the output provided to the invoking user may include a listing of choices for the invoking user.

In some implementations, a state mapping for a given customized interactive dialog application may be accompanied by an indication of a particular class of interactive dialog applications to which the given customized interactive dialog application belongs. For example, interactive dialog applications may include a "quiz" application, a "fact serving" application," and/or a "conversation" application. Each of the applications may have one or more states and/or transitions that are tailored to that class of application. For example, a "quiz" application may include a "Serve Question" state that provides a question to the user and then waits for input from the user. A "fact serving" application may instead only require a "yes" or "no" from the user to indicate when to stop the fact serving. Further, in some implementations, one or more states may be common to all classes of interactive dialog applications. In some implementations, a customized configuration description for a customized interactive dialog application may include, e.g., near the beginning of the file (e.g., as a header), a class identification.

In some implementations, one or more default states may be defined in a default configuration description. A default configuration description may include one or more states and transitions that do not have to be explicitly defined by the user via the state mapping application 170. In some implementations, states and transitions of the default configuration description may serve to fill in gaps left (intentionally or unintentionally) by a user when creating a customized interactive dialog application.

Figure 4:
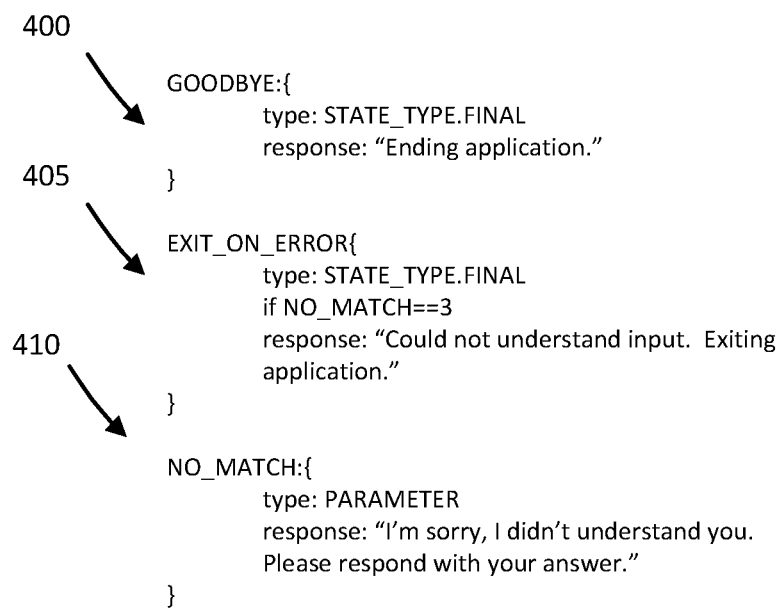
FIG. 4 illustrates an example default configuration description.

For example, referring to FIG. 4, an example default configuration description is provided. The default configuration description includes a "Goodbye" state 400, which defines default behavior to end an application. Further, the default configuration description includes a "Exit on Error" state 405 that may be utilized to end an application if a user provides non-matching input three times during execution of the application. Further, a "No Match" default state parameter 410 is included as a default behavior of all states when a user provides non-conforming input (i.e., input that input processing engine 112 cannot annotate and/or that is not an expected response that is defined in the custom configuration description). Further, the "No Match" default state parameter 410 may provide default behavior when a user has been prompted to provide input, and does not do so. The default state parameters may be, for example, looping transitions (i.e., a transition that directs the machine back to the same state) that are parameters of all states. Thus, regardless of whether the user has defined behavior for any of the parameters, all user-created states will be able to handle various parameters defined by the default configuration descriptions, such as unexpected inputs from a user, no input from a user, etc. Like the default states, default state parameters may optionally be defined by the developing user at the time of generating a customized configuration description and/or via the state mapping application. A default parameter may apply to all states, whether the state is a custom state or a default state.

One or more default configuration descriptions may be stored in the default configuration database 156. Additionally or alternatively, one or more default configuration descriptions may be utilized as a default template and one or more additional default configuration descriptions may be generated based on the default template. For example, a default configuration description may include "Behavior A" for all "No Match" instances. A developing user may edit the default configuration description to instead recite "Behavior B" as the default for "No Match" instances, and store the new default configuration description as "Default Description B." Thus, any future interactive dialog applications that utilize "Default Description B" will have, as the default behavior for "No Match" instances, the modified "Behavior B."

In some implementations, configuration builder 124 may merge a customized configuration description and a default configuration description into a single executable configuration description for the customized interactive dialog application. In merging the descriptions, configuration builder 124 will give precedence to any states, transitions, and/or other behaviors that are defined in the customized configuration description over the default configuration description. By doing so, configuration builder 124 ensures that any customized behavior that is defined by a user is included in the executed configuration description and is not overwritten by default states, transitions, and/or behaviors. For example, referring to the customized configuration description of FIG. 3, a "Goodbye" state 320 is defined by the developing user, and is also defined in the default configuration description of FIG. 4 ("Goodbye" state 400). Thus, through defining of the "Goodbye" state 320, the developing user has chosen to include customized behavior for the "Goodbye" state that is different than the default behavior. Configuration builder 124 may merge the configuration descriptions into a single executed configuration description that includes only the definition of the "Goodbye" state 320 from the customized configuration description (and excludes any definition based on the default configuration description "Goodbye" state 400).

In some implementations, configuration builder 124 provides a merged configuration description to one or more components that may generate an agent based on the merged configuration description. For example, an agent generator may utilize one or more libraries to generate an agent that performs the customized behavior described in the merged configuration description, and the agent may be invoked at a later time by one or more additional invoking users. Thus, the configuration builder 124 may be utilized as a tool that allows a developing user to generate customized behavior in an agent without detailed knowledge of the underlying libraries that would otherwise be required to fully develop a robust interactive dialog application.

In some implementations, configuration builder 124 may generate a customized configuration description based on multiple previously generated customized configuration descriptions. For example, configuration builder 124 may have been utilized to previously generate a "Trivia" customized configuration description that includes states and transitions for a trivia game. Further, configuration builder 124 may have been utilized to previously generate a second custom configuration description for a "Fun Facts" dialog application. Based on the state mappings and transitions of both of the configuration descriptions, configuration builder 124 can be utilized to generate a new custom configuration description for a "Trivia/Fun Facts" dialog application that includes the custom behavior of both the "Trivia" application and the "Fun Facts" application. In some instances, a developing user may provide the custom configuration descriptions to the configuration builder 124. In some instances, one or both of the custom configuration descriptions may be identified by one or more other components. For example, a user may have interest in a "Trivia/Fun Fact" application and provide the "Fun Facts" configuration description, and configuration builder 124 may identify a "Trivia" customized configuration description to merge with the provided "Fun Fact" configuration description. In some implementations, more than two configuration descriptions may be merged to generate a new configuration description.

As another example, one or more developing users may have previously utilized configuration builder 124 to generate a custom configuration description for a "Payment" dialog application that handles receiving payment information from a user via an automated assistant. Further, one or more developing users may have previously utilized configuration builder 124 to generate a custom configuration description for an "Ordering" dialog application that handles receiving product ordering information. A given developing user may have interest in combining the two previously generated configuration descriptions into a single custom configuration description for a dialog application that allows users to place orders and provide payment information.

Merging multiple configuration descriptions may include conflicts when both configuration descriptions include states, mappings, and/or transitions that are defined in both descriptions. For example, two configuration descriptions to be merged may include different "Welcome" states with different prompts and different transitions. Configuration builder 124 can determine such conflicts based on comparing states, mappings, and/or transitions between multiple configuration descriptions to be merged. Further, configuration builder 124 can provide a prompt to a developing user that indicates such conflicts and that further indicates that such conflicts may need to be resolved before a merged configuration description may be generated. Additionally or alternatively, a developing user can provide an additional configuration description that includes state and/or transition information to include in the configuration description when a conflict is identified. In some instances, the developing user may indicate one of the configuration descriptions to take precedence in any conflicts. For example, the developing user may indicate that a "Trivia" configuration description information be utilized for any states or transitions over conflicting states and/or transitions included in a "Fun Facts" configuration description.

In some implementations, one or more optional states may be utilized to prompt, via a dialog application, for mandatory data for one or more objects that are utilized by a dialog application. As an example, in an "Ordering" customized configuration description, an object may be created for a user profile that includes "Name," "Phone Number," and "Address." When the object is created and data retrieved from, for example, an external database, one or more of the fields of the object may not be defined. To define any of the mandatory fields of the object, the configuration description may include one or more states that allow dialog module 126 to provide dialog prompting a user to provide the mandatory information to complete the user profile. Alternatively or additionally, the configuration description may include a reference to one or more additional sources and may first attempt to retrieve the missing information from one or more sources before prompting the user or instead of prompting the user.

In some implementations, a single state may be utilized to prompt a user for mandatory data, and the dialog application may remain in the state until all mandatory data has been provided and/or the user indicates a transition to another state. For example, the description for the "Ordering" state described above may include definitions of prompts for each mandatory data field that is required for placing an order. The resulting dialog may include a prompt to the user to provide a name, a prompt for providing an address, and a prompt for providing a phone number. The dialog application may remain in the "Ordering" state until all mandatory data has been provided or the user indicates a different transition (e.g., "Quit" or "Start over").

Once a customized configuration description has been generated, it may be stored in the custom configuration database 158 and indexed by and/or mapped to an invocation phrase for the application. Alternatively, a merged configuration description, as described herein, may be stored in the custom configuration database 158. In some implementations, custom configuration database 158 may include only the configuration descriptions of the user. In some implementations, the custom configuration database 158 may include configuration descriptions of applications from multiple users. A subsequent (or "invoking") user may provide free form natural language input to the automated assistant 110. Based on invocation phrase(s) contained in the free form natural language input, the automated assistant 110 may identify a stored customized interactive dialog application in the custom configuration database 158. Alternatively, based on the invocation phrase(s), an agent may be identified that was generated based on the customized configuration description of a developing user. Once the customized interactive dialog application is identified, a particular interactive dialog application class associated with the customized interactive dialog application may be used to identify a default configuration description in default configuration database 156. The invocation engine 160 processes an invocation request to determine which of a plurality of previously submitted customized versions, each submitted by a developing user or other users and stored in the custom configuration database 158, of the interactive dialog application is being invoked. In some implementations, when a customized application is generated, the user may provide an invocation phrase to be utilized in the future to invoke the application. In some implementations, one or more entities may be identified as related to the provided invocation phrase, and the invocation engine 160 may select one or more of the customized versions based on user input and the related entities. As described herein, in some situations the automated assistant 110 may still serve as an intermediary when a customized interactive dialog application is invoked. For example, in serving as an intermediary where natural language input of a user is voice input: the input processing engine 112 of the automated assistant 110 may convert that voice input to text, the invocation engine 160 may utilize the text to determine which of the customized interactive dialog applications in the custom configuration database 158 is being invoked, and receive responsive content from the invoked customized interactive dialog application; and the output engine 135 may provide output that is based on the custom interactive dialog application for presentation to the user via the client device 106.

In some implementations, dialog module 126 may identify, based on the current input from the invoking user and the current state, whether a next state is defined in the current custom configuration description. If the state is defined, the dialog module 126 determines a next output to be rendered for providing to the user. If the next state is not defined, the dialog module 126 may then determine whether a matching state is defined in one or more applicable default configuration descriptions that are applicable to the class of dialog application that has been invoked. In some implementations, an "Error" or "No Match" state may be defined in the default configuration description to handle all state/transitions that are not defined elsewhere.

In some implementations, a state may be defined in both the default and custom configuration descriptions. For example, a "Goodbye" state may be defined in the default configuration description so that, regardless of whether the developing user defined an end state in the custom configuration description, the customized interactive dialog application nevertheless has a state for halting execution (e.g., a "catch all" or "fall back"). However, dialog module 126 will check first in the custom configuration description and, if the user has also defined a "Goodbye" state, will not look at the default configuration description. Thus, the dialog module 126 ensures that any user-defined behavior takes precedence over any default behavior when the application is executing. Alternatively, as described herein, dialog module 126 may instead utilize a merged configuration description that includes both the default and customized configuration description, with only customized states and transition information provided for states that are included in both descriptions.

In some instances, a customized configuration description may not include explicit state information but instead may include an indication of a location of state information. For example, a "Trivia" dialog application may not include trivia questions in the customized configuration description but instead include a reference to a database and/or a function call to retrieve information from a database, either internal to the automated assistant or externally. When dialog module 126 identifies a state that includes an indication of another source rather than state information, external source module 128 processes the function and retrieves the state information. For example, referring again to a "Trivia" dialog application, the questions and/or answers may not be explicitly included in the customized configuration description but instead are stored in information database 157 and/or other external resource. The "Fetch Next Question" state of the configuration description may include a function call to retrieve a question from an external resource. For example, external source module 128 can identify an API for a trivia question resource and interface with the trivia question resource via the API to identify a next trivia question. As another example, external source module 128 can identify information database 157 as including trivia questions, and can make a direct call to the information database 157 to retrieve a next trivia question. Any next trivia question can be stored locally for providing as part of a dialog or may be dynamically retrieved when required for continuance of the dialog. The question may then be provided to the invoking user as described herein (e.g., via output engine 135).

In some implementations, one or more components may track and/or update information as the dialog application is executing. For example, in a "Trivia" dialog application, a score may be kept. Thus, a "Correct Answer" state may include instructions to increment a score counter. The score may be stored in the configuration description or may alternatively be stored by one or more other components, such as in an information database 157.

In some implementations, a customized configuration description and/or a default configuration description may include a definition of a transition that is shared by all states. The transition may then be utilized to move temporarily to a different state, generate dialog regardless of the current state of the dialog application, and then return to the same state. For example, a customized configuration description may include a "Help" action. Whenever the user provides input of "help" (or a similar phrase), the dialog application may provide help information to the user and/or transition to a "Help" state to provide help information to the user in one or more subsequent dialog turns. The dialog application may then return back to the same state as it was in when the user invoked the "help" command. In some implementations, an action may be defined that permanently transitions to a different state. For example, a "Restart" action may be defined that transitions to the starting state of the dialog application regardless of what state the dialog application is in when the "Restart" action was invoked.

In some implementations, a customized configuration description and/or default configuration description may include a definition of a sub-dialog that may be invoked when the dialog application is in any state. A sub-dialog may include one or more states and transitions between the states that may be invoked while the dialog application is in any state. The dialog application may store an indication of the current state when the sub-dialog is invoked. Once the sub-dialog has concluded, the dialog application may return to the state that it was in when the sub-dialog was invoked. For example, a customized trivia dialog application may include a "Joke" sub-dialog and the customized configuration description may include an invocation phrase for the "Joke" sub-dialog. While the trivia dialog application is executing, the user may provide the invocation phrase while it is in any state, and the "Joke" sub-dialog may provide one or more jokes (depending on defined states and transitions of the sub-dialog). Once the user invokes the "Joke" exit phrase, the dialog application may return to the same state that it was in when the "Joke" sub-dialog was first invoked.

Figure 5:
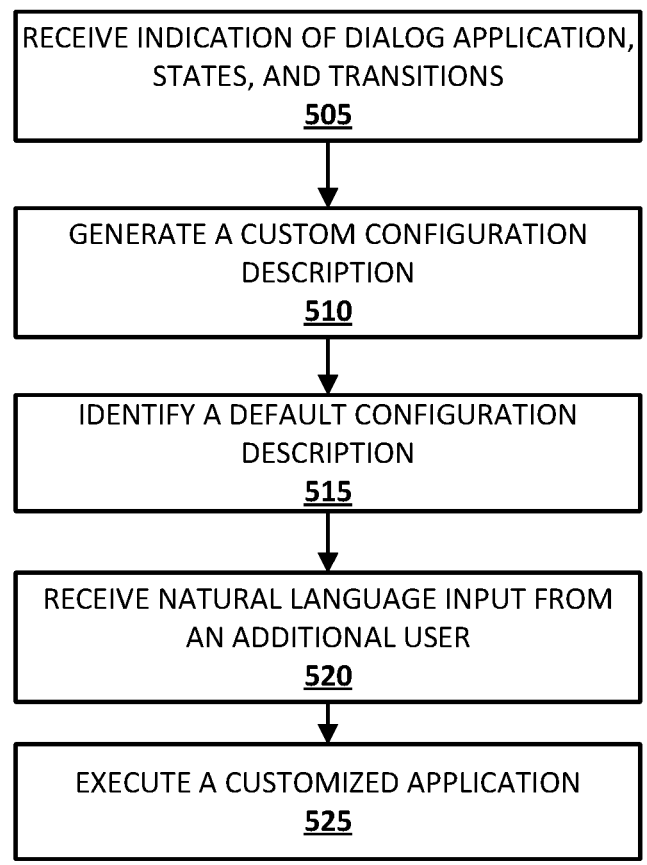
FIG. 5 is a flowchart illustrating an example method according to implementations disclosed herein.

FIG. 5 illustrates a flowchart of an example method according to implementations disclosed herein. One or more steps may be omitted, performed in a different order, and/or one or more additional steps may be included in various implementations.

At step 505, an indication of an interactive dialog application class is received with state and transition information. The indication may be utilized to determine which of a plurality of classes of dialog applications a developing user has interest in creating. In some implementations, the state and transition information may be previously generated by the user utilizing one or more state mapping applications, such as state mapping application 170.

At step 510, a custom configuration description is generated based on the states and transitions received at step 505. In some implementations, the custom configuration description includes custom state names and conditions for input from an invoking user that allows the application to transition from one state to another state. For example, a custom configuration description may be generated that shares one or more characteristics with the custom configuration description illustrated in FIG. 3. The custom configuration description is then stored and indexed by an invocation phrase that may additionally be provided by the developing user.

At step 515, a default configuration description is identified based on the indication received at step 505. In some implementations, each class of dialog applications may have its own default configuration description that includes state information regarding default states that are unique to that class of application. In some implementations, all applications may share the same default configuration description.

At step 520, natural language input from an additional user (i.e., an invoking user) is received. The natural language input is parsed to determine whether the invocation phrase provided by the developing user is included in the natural language input. If the invocation phrase is identified, the corresponding custom configuration description and default configuration description are retrieved and the custom application is configured.

At step 525, a customized application is provided to the additional user. The customized application includes dialog turns based on the information provided in the customized configuration application. If one or more states and/or transitions cannot be identified in the custom configuration description, the default configuration description may be utilized to determine how to proceed based on a current state of the application and the input of the user.

Figure 6:
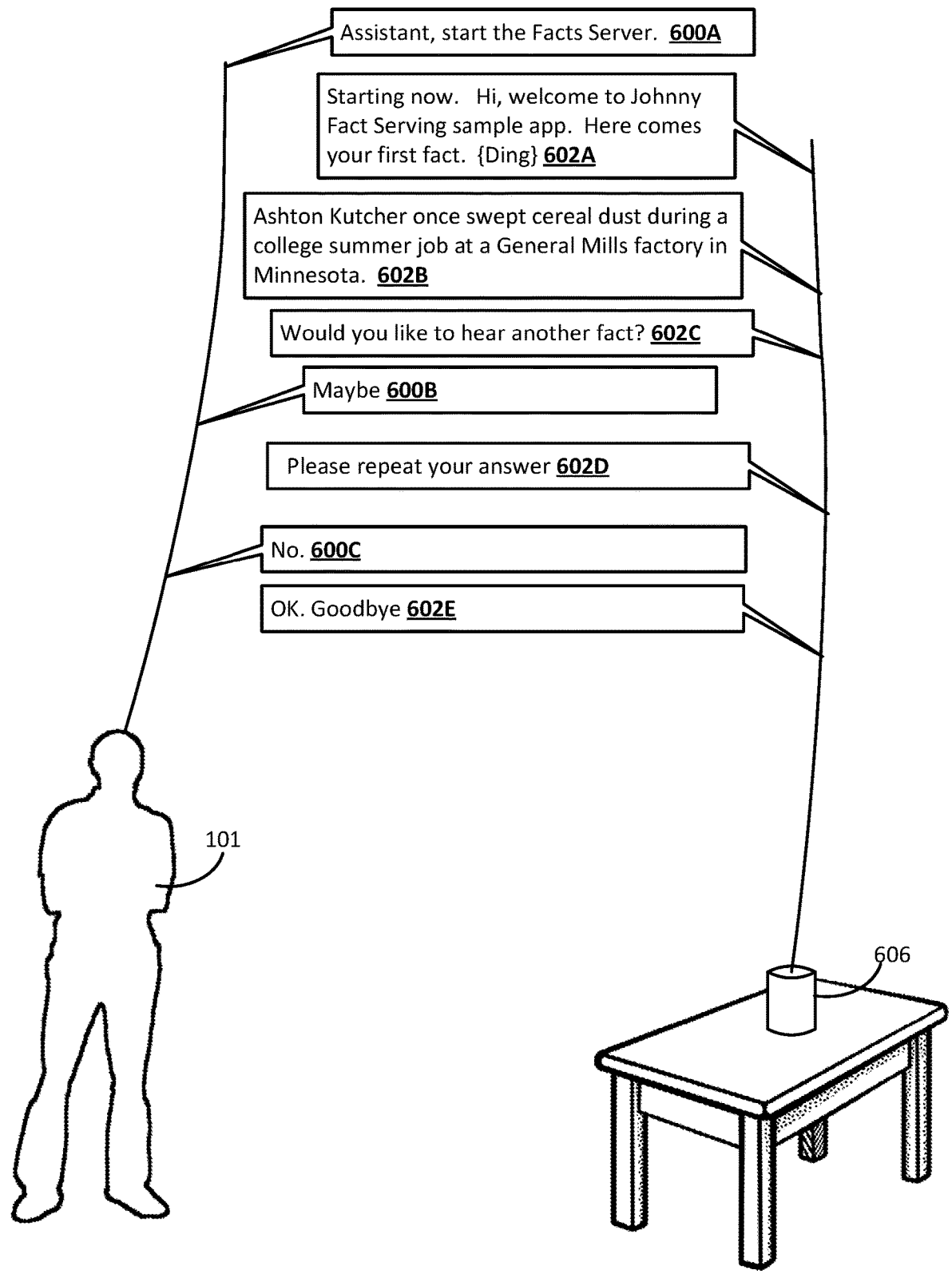
FIG. 6 illustrates a user, a client device, and an example dialog between the user and an automated assistant associated with the client device executing an interactive dialog application, according to implementations disclosed herein.

FIG. 6 illustrates a user 101, a voice-enabled client device 606, and an example of dialog that may occur between the user 101 and an automated assistant associated with the client device 606 with access to a customized interactive dialog application. The client device 606 includes one or more microphones and one or more speakers. One or more aspects of the automated assistant 110 of FIG. 1 may be implemented on the client device 606 and/or on one or more computing devices that are in network communication with the client device 606. Accordingly, for ease in explanation the automated assistant 110 is referenced in description of FIG. 6.

User input 600A is an invocation phrase for a customized dynamic interactive fact serving application. The input processing engine 112 provides invocation engine 160 with the parsed input, as described above. One or more components may then identify the custom configuration description and default configuration description for the custom dialog application that matches the invocation phrase.

At output 602A, the application executes the "Welcome" state as defined in the custom configuration description in FIG. 3. The "Welcome" state is a pass-through state and does not require input from the invoking user to transition to the next state.

Figure 2:
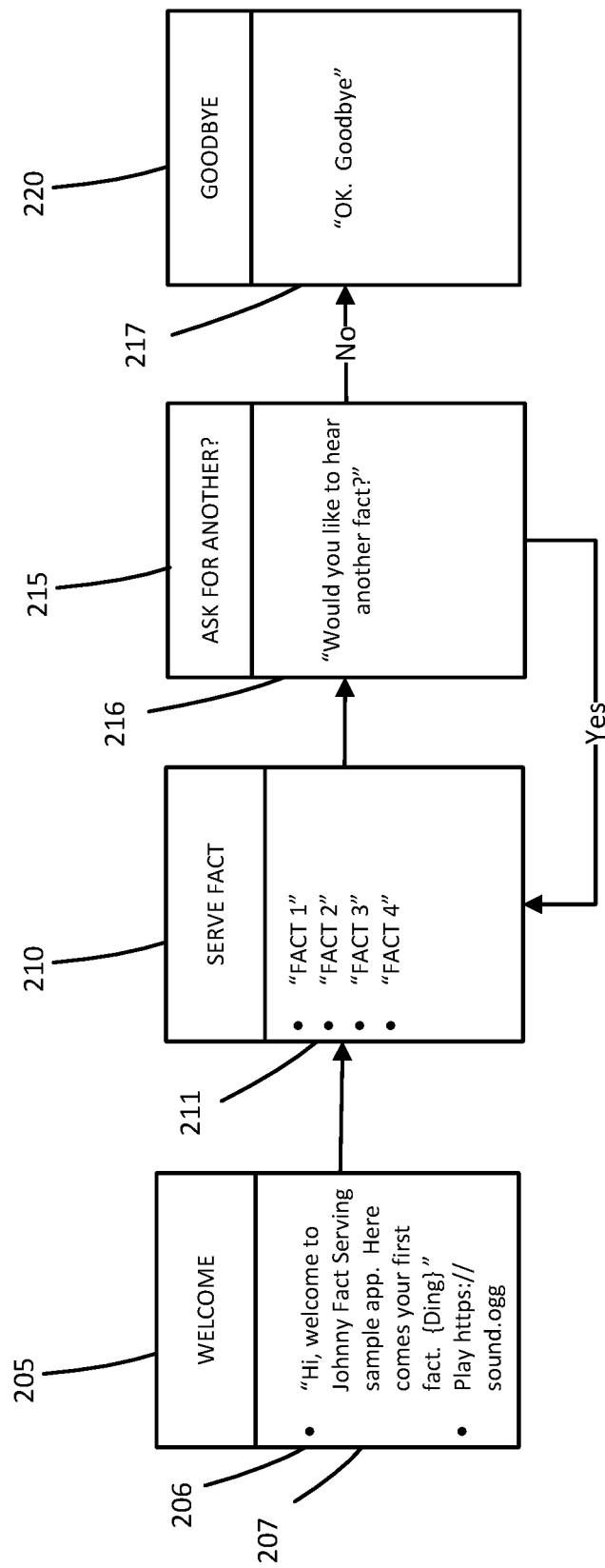
FIG. 2 is an example of a graphical state diagram that may be utilized in implementations disclosed herein.

At output 602B, a fact is served from the "Serve Fact" state illustrated in FIG. 2 and provided in the customized configuration description of FIG. 3. Again, the "Serve Fact" state is a pass-through state and does not require input from the invoking user to move the application to the next state.

At 602C, the application has entered the "Ask For Another" state and prompts the invoking user as to whether the user has interest in hearing an additional fact, as defined in the state mapping of FIG. 2 and the customized configuration description of FIG. 3. This state is a "yes/no" state and requires one of those responses to move to another state.

Instead, user input 600B is an ambiguous "Maybe," which is not handled by the "Ask For Another" state in the customized configuration description. Thus, the application identified a "No Match" default state parameter for the "Ask For Another" state in the default configuration description that handles instances where non-conforming input is received. At output 602D, the application provides the default state behavior for "No Match" input. In some implementations, the developing user may define custom behavior for the customized application for handling non-conforming input by defining the "No Match" parameter in the customized configuration description.

At user input 600C, the user provides input that conforms to the expected input for the state. By responding "No," the application transitions to the "Goodbye" state that is defined in the customized configuration description. Of note, the default configuration description also includes a "Goodbye" state, but the application first identifies whether the state is defined in the customized configuration description and only checks the default configuration description if a custom state was not identified.

Although FIG. 6 has been described herein as identifying states, transitions, and behaviors from two separate descriptions, in some implementations, the customized configuration description and the default configuration description may be merged into a single description that is utilized at the time of execution of the application. Alternatively, the dialog provided in FIG. 6 may be between the user 101 and an agent generated previously based on a customized configuration description of a user and a default configuration description. Further, although a customized configuration description and default configuration description are described herein as including the same states, which are resolved by selecting customized states over default states, in some instances, the customized configuration description will include only user-created states and will not change any of the default behavior of the subsequent application from that which is defined in the default configuration description.

As generally described herein and illustrated in FIG. 6, the automated assistant may be executing on a stand-alone device that interacts with users via voice commands. However, in some instances, the device may include additional hardware and/or software to allow a user to interact with the automated assistant in forms other than through speech. Thus, although speech is described in some examples herein as one form of interaction between the user and the dialog application, the user may provide input via elements of a user interface (UI) (e.g., touching UI elements on a touchscreen, clicking on UI elements via a mouse, typing via a hardware keyboard and/or virtual keyboard) in addition to or instead of via voice commands.

In some implementations, one or more states may include multiple forms for providing output to a user, and the form in which output is provided may vary based on the platform and/or interface of the device that is providing the output. For example, a state definition may include a list of options, and the list may be provided to the user via an automated assistant as speech alone if the device executing the assistant does not have a screen. Alternatively, if the device supports visual output, the configuration description may include graphics and/or other visual elements to provide the same list to the user. As another example, a trivia dialog application may include graphics to provide to a screen to show a current category for a trivia question. If the executing device does not include a screen, the dialog application may instead provide audio output of the category before providing a question to the user. In some implementations, the custom configuration description may include a hierarchy of how to provide output and the dialog application may determine which to use based on the hierarchy and/or which forms of output are supported by the device via which the output is to be provided. The hierarchy can define an ordered preference for how output should be provided, if supported by the device. For example, a hierarchy can define that output should most preferably be provided via a carousel (i.e., providing visual information with one or more previous and/or subsequent visual images partially visible on the screen), followed by one or more next preferable forms of providing output. If the device supports provision of output in a carousel format, output can be provided via the most preferable carousel format. If, however, the device does not support providing output via a carousel, a next most preferable (and supported) format of providing the output may instead be utilized (e.g., a static image, a media card, audibly).

Figure 7:
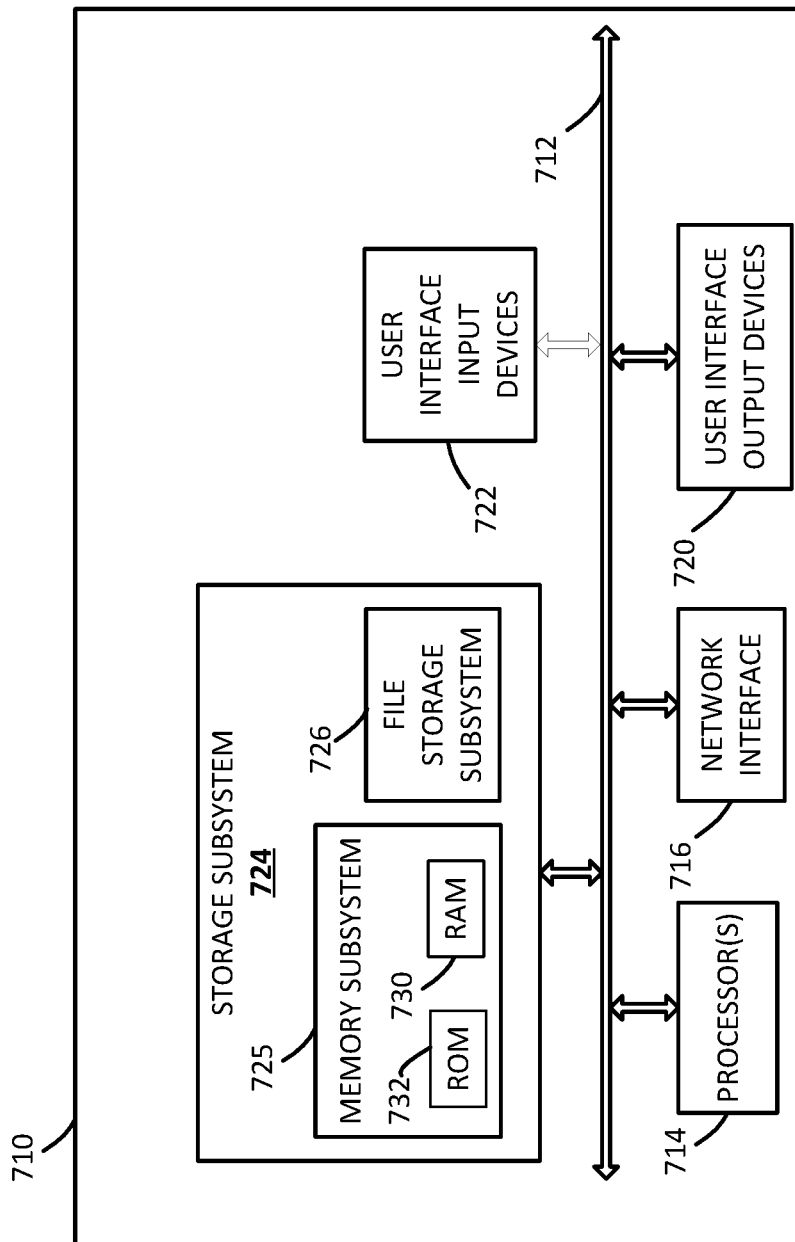
FIG. 7 illustrates an example architecture of a computing device.

FIG. 7 is a block diagram of an example computing device 710 that may optionally be utilized to perform one or more aspects of techniques described herein. In some implementations, one or more of device 106, automated assistant 110, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 5 and/or of other methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

The invention claimed is:

1. A method implemented by one or more processors, comprising:
receiving an indication of an interactive dialog application and a state map of custom states and custom state transitions from a graphical state application for a user-created customized interactive dialog application, wherein each of the custom states defines custom state information for a corresponding one of the custom states and each of the custom state transitions defines custom transition information from a corresponding one of the custom states;
generating a customized configuration description based on the custom states and custom state transitions;
identifying a default configuration description based on the indication of the interactive dialog application, wherein the default configuration description includes default state information and default transition information for one or more default states;
receiving natural language input provided via an assistant interface of a client device operated by an additional user;
determining the natural language input references the interactive dialog application; and
in response to determining the natural language input references the interactive dialog application:
executing a customized interactive dialog application based on both the customized configuration description and the default configuration description, wherein executing the customized interactive dialog application comprises:
generating multiple instances of output for rendering via the assistant interface during an interactive dialog between the additional user and the customized interactive dialog application,
wherein each of the multiple instances of output is for a corresponding one of multiple dialog turns of the interactive dialog during execution of the customized interactive dialog application, and
wherein at least some of the multiple instances of output are generated using the customized configuration description and at least some of the multiple instances of output are generated using the default configuration description.

2. The method of claim 1, wherein generating a given instance of output of the multiple instances of output at a given dialog turn of the multiple dialog turns comprises:
identifying a current state of the interactive dialog at the given dialog turn;
determining whether the current state of the interactive dialog is one of the custom states of the customized configuration description; and
in response to determining the current state of the interactive dialog is one of the custom states of the customized configuration description:
generating the given instance of output based on the custom state information defined for the one of the custom states.

3. The method of claim 2, wherein generating an additional given instance of output of the multiple instances of output at a given additional dialog turn of the multiple dialog turns comprises:
identifying an additional current state of the interactive dialog at the given additional dialog turn;
determining whether the additional current state of the interactive dialog is one of the custom states of the customized configuration description; and
in response to determining the additional current state of the interactive dialog is not one of the custom states of the customized configuration description:
identifying one of the default states that matches the additional current state; and
generating the additional given instance of output based on the default state information defined for the one of the default states.

4. The method of claim 3, further comprising:
in response to identifying the one of the default states that matches the additional current state:
using the default transition information for the one of the default states to transition to a further custom state of the custom states of the customized configuration description;
after generating the additional given instance of output based on the default state information defined for the one of the default states:
receiving, in response to the additional given instance of output, responsive user interface input provided via the assistant interface of the client device; and
based on having transitioned to the further custom state, using the further custom state to generate a further instance of output of the multiple instances of output at a given further dialog turn of the multiple dialog turns.

5. The method of claim 3, wherein the one of the default states is a default error state and wherein the default state information defined for the default error state is default error state information.

6. The method of claim 3, wherein the one of the default states is a default starting state and wherein the default state information defined for the default starting state is default starting state information.

7. The method of claim 1, wherein generating a given instance of output of the multiple instances of output at a given dialog turn of the multiple dialog turns comprises:
identifying a current state of the interactive dialog at the given dialog turn;
determining whether the current state of the interactive dialog is one of the custom states of the customized configuration description; and
in response to determining the current state of the dialog is one of the custom states of the customized configuration description:
generating the given instance of output based on the custom state information defined for the one of the custom states,
wherein the custom state information defined for the one of the custom states comprises custom audio, and wherein generating the given instance of output comprises causing the custom audio to be rendered via one or more speakers of the client device.

8. The method of claim 1, wherein generating a given instance of output of the multiple instances of output at a given dialog turn of the multiple dialog turns comprises:
identifying a current state of the interactive dialog at the given dialog turn;
determining whether the current state of the interactive dialog is one of the custom states of the customized configuration description; and
in response to determining the current state of the interactive dialog is one of the custom states of the customized configuration description:
generating the given instance of output based on the custom state information defined for the one of the custom states,
wherein the custom state information defined for the one of the custom states comprises an external resource for use in generating the given instance of output, and wherein generating the given instance of output comprise interfacing with the external resource.

9. The method of claim 8, wherein interfacing with the external resource comprises communicating with the external resource over a network and using an application programming interface.

10. The method of claim 1, wherein the custom transition information for a given custom state of the custom states comprises an expected response and an additional custom state of the custom states to transition to if the expected response is received.

11. The method of claim 10, wherein the custom transition information for the given custom state further comprises an alternative expected response and an alternative custom state of the custom states to transition to if the alternative expected response is received.

12. The method of claim 10, wherein the custom transition information for a given custom state of the custom states lacks any definition for at least one possible response, and generating a given instance of output of the multiple instances of output at a given dialog turn of the multiple dialog turns comprises:
 receiving, while in the given custom state, user interface input provided via the assistant interface of the client device;
 determining that the user interface input does not conform to the custom transition information for the given custom state; and
 in response to determining that the user interface input does not conform to the custom transition information for the given custom state:
  identifying one of the default states that conforms to the user interface input; and
  generating the given instance of output based on the one of the default states.

13. A method implemented by one or more processors, comprising:
 receiving an indication of an interactive dialog application and a state map of custom states and custom state transitions from a graphical state application for a user-created customized interactive dialog application, wherein each of the custom states defines custom state information for a corresponding one of the custom states and each of the custom state transitions defines custom transition information from a corresponding one of the custom states;
 generating a customized configuration description based on the custom states and the custom state transitions;
 identifying a default configuration description based on the indication of the interactive dialog application, wherein the default configuration description includes default states, and default state information and at least one default state transition for each of the default states;
 generating a merged configuration description based on the customized configuration description and the default configuration description, wherein generating the merged configuration description comprises:
  identifying a given custom state, of the custom states, that is included in the customized configuration description and that includes a counterpart given default state, of the default states in the default configuration description; and
  based on the given custom state being included in the customized configuration description:
   including the given custom state in the merged configuration description without including the counterpart given default state in the merged configuration description; and
 generating a customized agent based on the merged configuration description, wherein the customized agent is executable by a system of one or more computers to interface with an automated assistant in engaging in interactive human-computer dialog.

14. The method of claim 13, wherein generating the merged configuration description comprises:
 identifying a given custom state transition, of the custom state transitions, that is included in the customized configuration description and that includes a counterpart given default state transition, of the default state transitions, in the default configuration description;
 based on the given custom state transition being included in the customized configuration description:
  including the given custom state transition in the merged configuration description without including the counterpart given default state transition in the merged configuration description.

15. The method of claim 13, wherein when interfacing with the automated assistant in engaging in the interactive human-computer dialog, the customized agent receives requests from the automated assistant that are generated based on user interface input provided to the automated assistant via a client device, and the customized agent generates responsive content and transmits the responsive content to the automated assistant for provisioning of output that is based on the responsive content.

16. The method of claim 13, wherein the default configuration description is specific to the automated assistant, and wherein the customized agent is particularized to the automated assistant.

17. The method of claim 16, further comprising:
 identifying an additional default configuration that is specific to an additional automated assistant, wherein the additional default configuration description includes additional default states, and additional default state information and at least one additional default state transition for each of the additional default states;
 generating an additional merged configuration description based on the customized configuration description and the additional default configuration description, wherein generating the additional merged configuration description comprises:
  identifying a given additional custom state, of the custom states, that is included in the customized configuration description and that includes a counterpart additional given default state, of the additional default states in the additional default configuration description;
  based on the given additional custom state being included in the customized configuration description:
   including the additional given custom state in the additional merged configuration description without including the counterpart given additional default state in the additional merged configuration description; and
 generating an additional customized agent based on the merged configuration description, wherein the customized agent is executable by an additional system of one or more computers to interface with the additional automated assistant in engaging in interactive human-computer dialog.

18. The method of claim 13, wherein generating the merged configuration description further comprises:

determining that an additional default state, of the default states in the default configuration description, does not include any counterpart in the custom states included in the customized configuration description;

based on determining that the additional default state does not include any counterpart in the custom states:
    including the additional default state in the merged configuration description.

19. The method of claim 18, further comprising determining that the additional default state is indicated as mandatory in the default configuration description, wherein including the additional default state in the merged configuration description is further based on determining that the additional default state is indicated as mandatory.

\* \* \* \* \*